Figure 23:
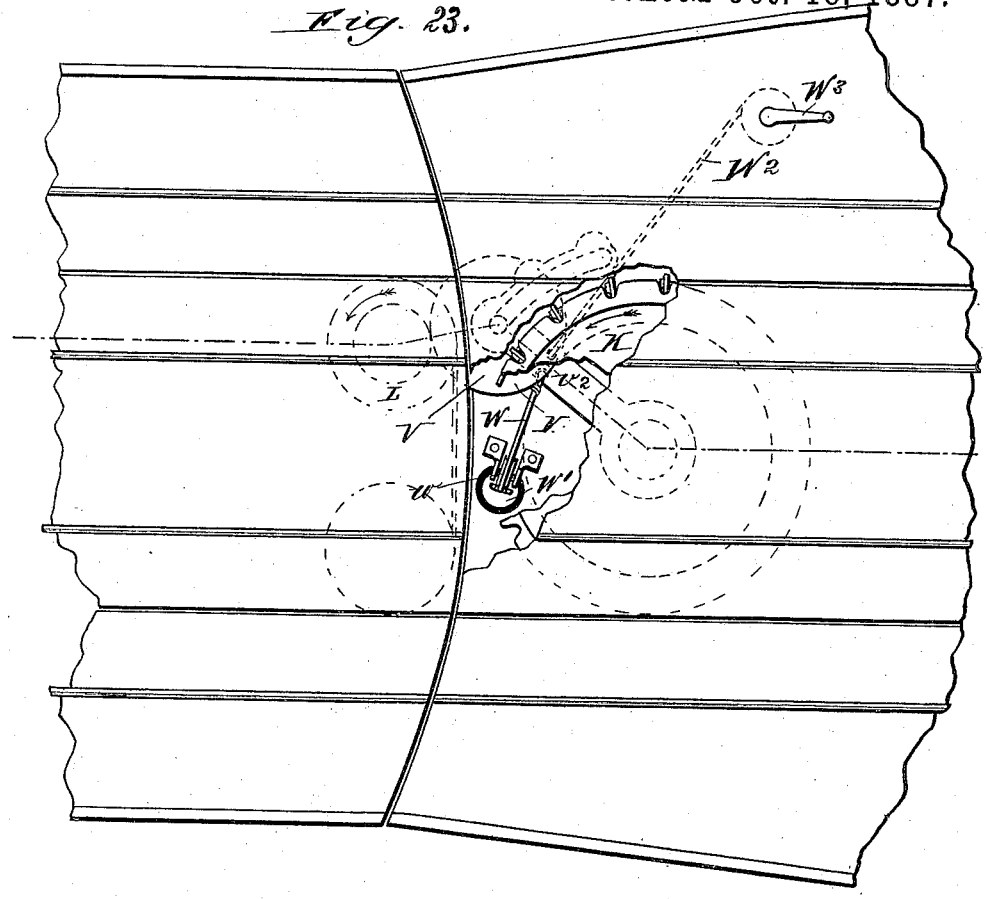

(No Model.) 7 Sheets—Sheet 1.
H. W. McNEILL.
CABLE RAILWAY APPARATUS.
No. 371,695. Patented Oct. 18, 1887.
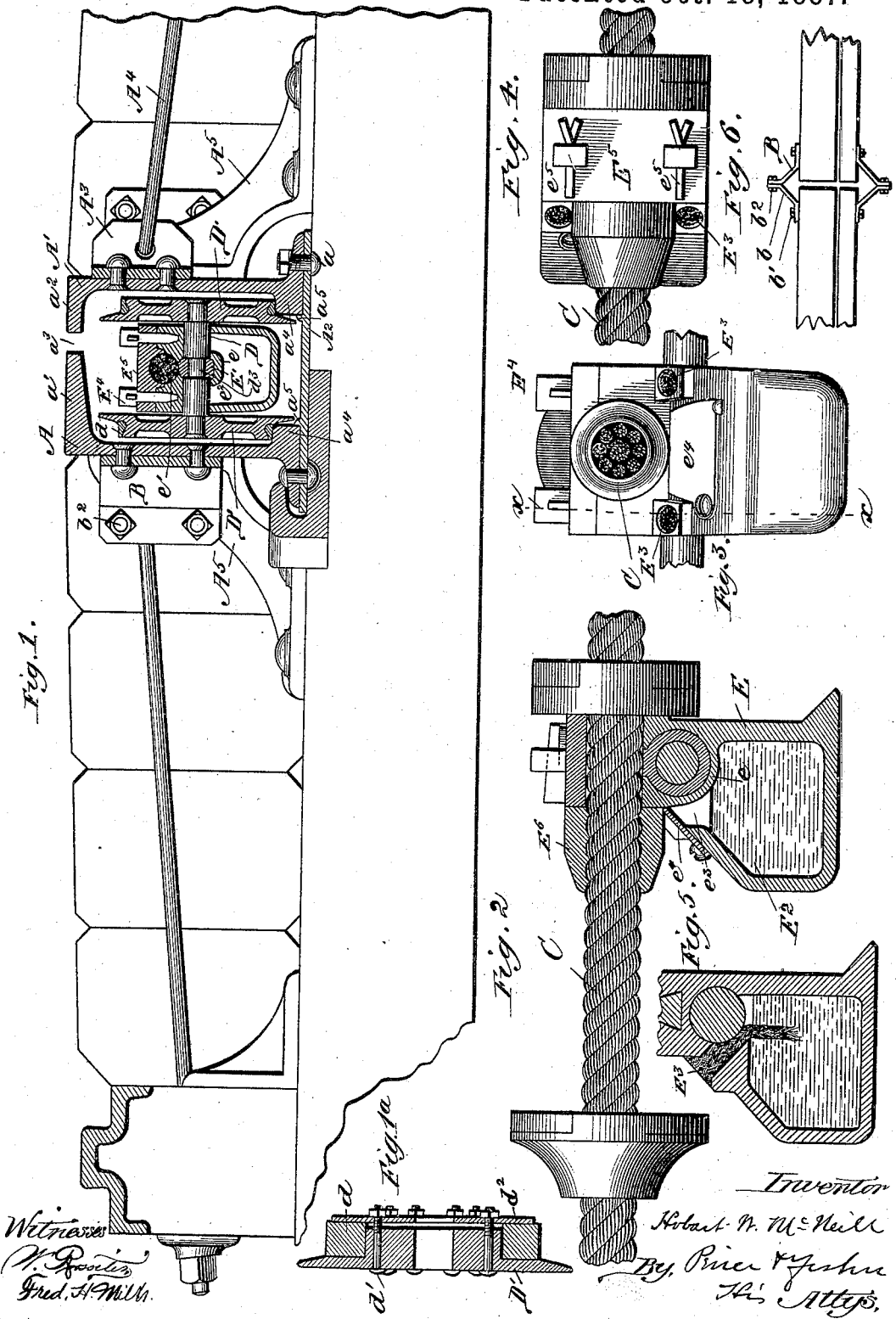

(No Model.) 7 Sheets—Sheet 2.
H. W. McNEILL.
CABLE RAILWAY APPARATUS.
No. 371,695. Patented Oct. 18, 1887.
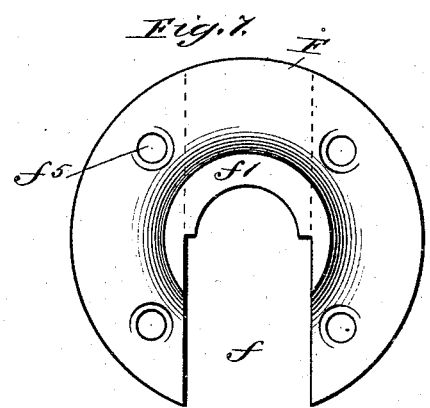
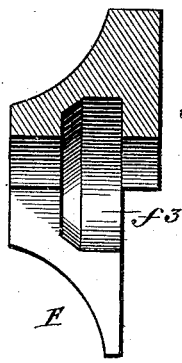
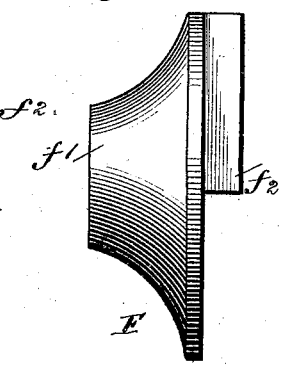
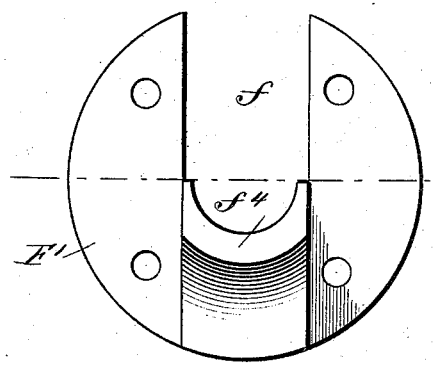
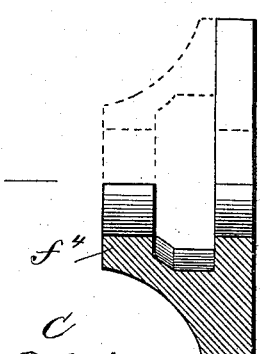
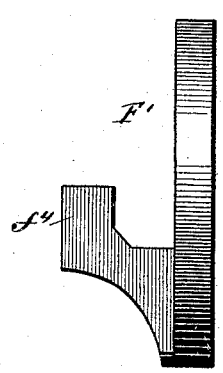
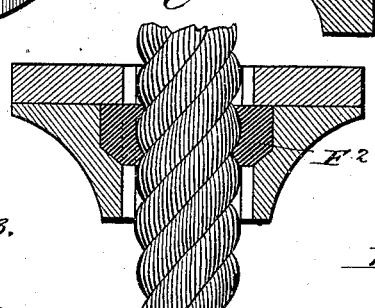
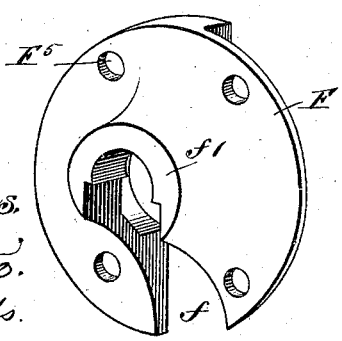
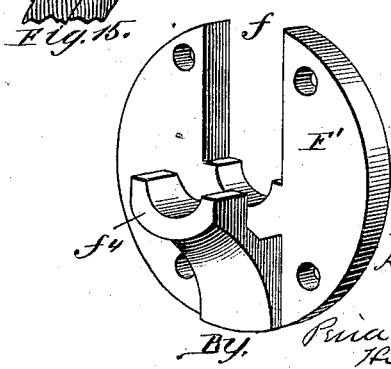
Witnesses.
W. Rossiter.
F. Mills.
Inventor
H. W. McNeill
By Rice & Kuhn
his Attys.

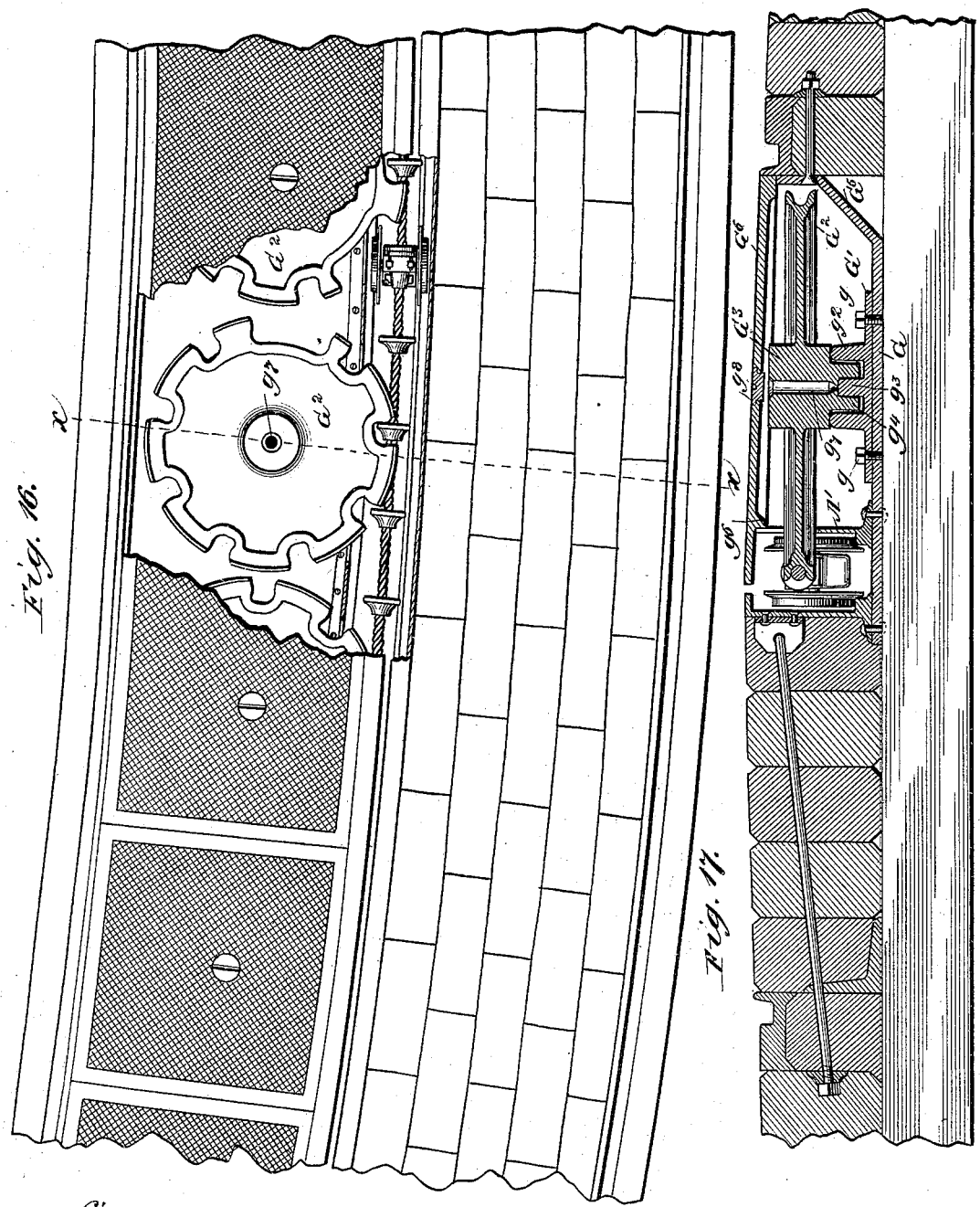

(No Model.) 7 Sheets—Sheet 4.
H. W. McNEILL.
CABLE RAILWAY APPARATUS.
No. 371,695. Patented Oct. 18, 1887.
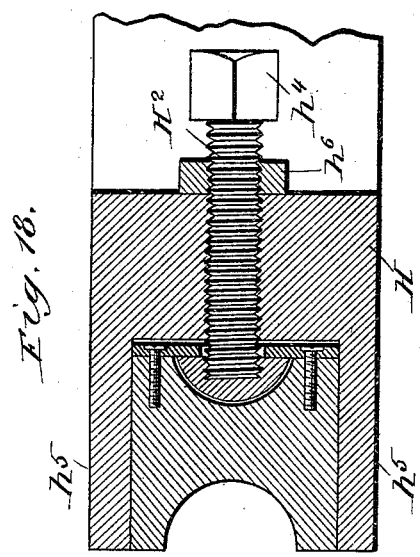
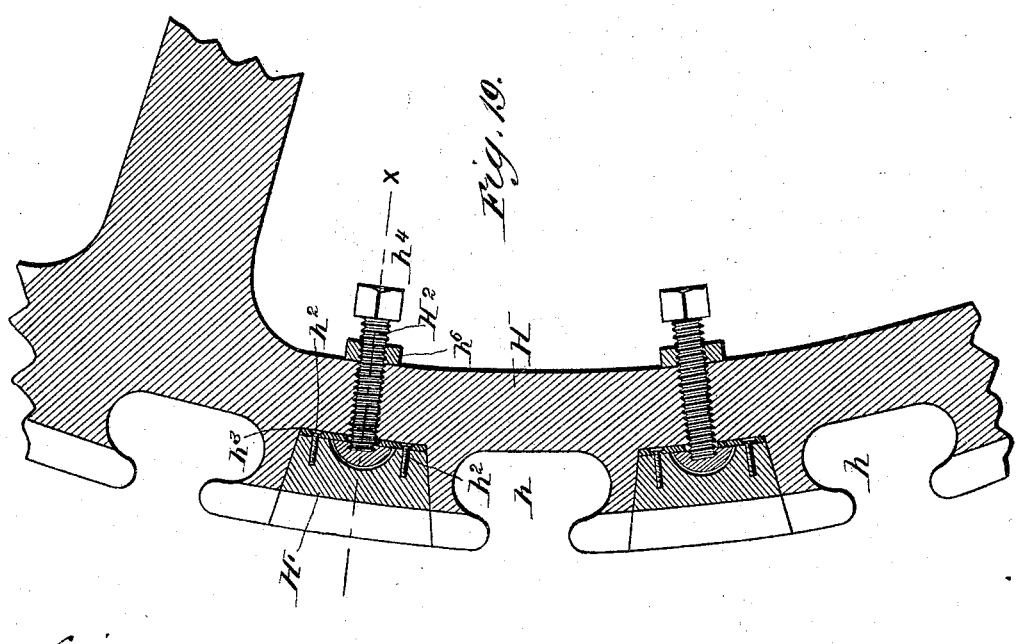
Witnesses.
W. Rossiter
Fred. H. Mills.
Inventor
Hobart W. McNeill
By, Price & Fisher
His Atty.

(No Model.) 7 Sheets—Sheet 5.
H. W. McNEILL.
CABLE RAILWAY APPARATUS.
No. 371,695. Patented Oct. 18, 1887.
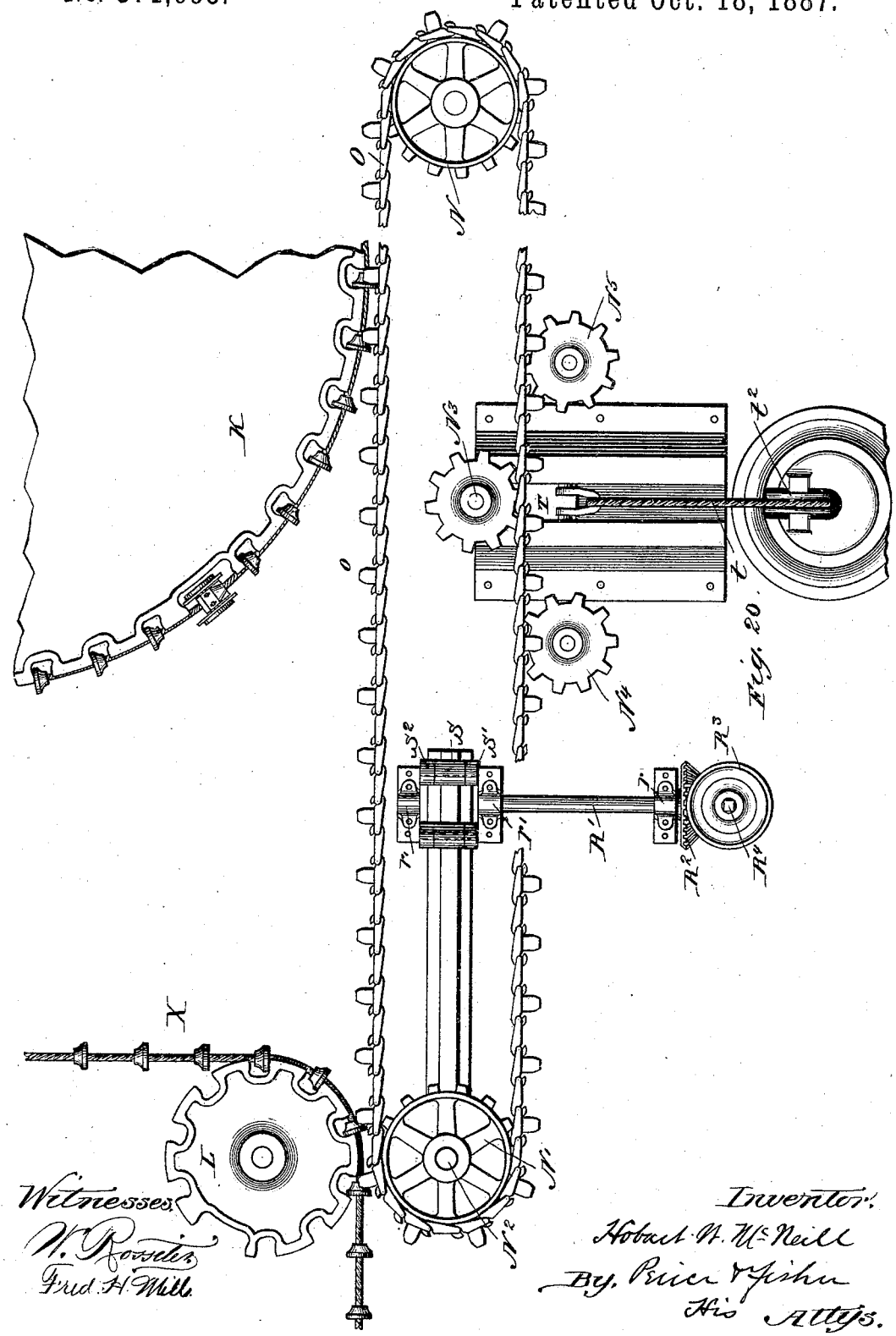

(No Model.) 7 Sheets—Sheet 6.
H. W. McNEILL.
CABLE RAILWAY APPARATUS.
No. 371,695. Patented Oct. 18, 1887.
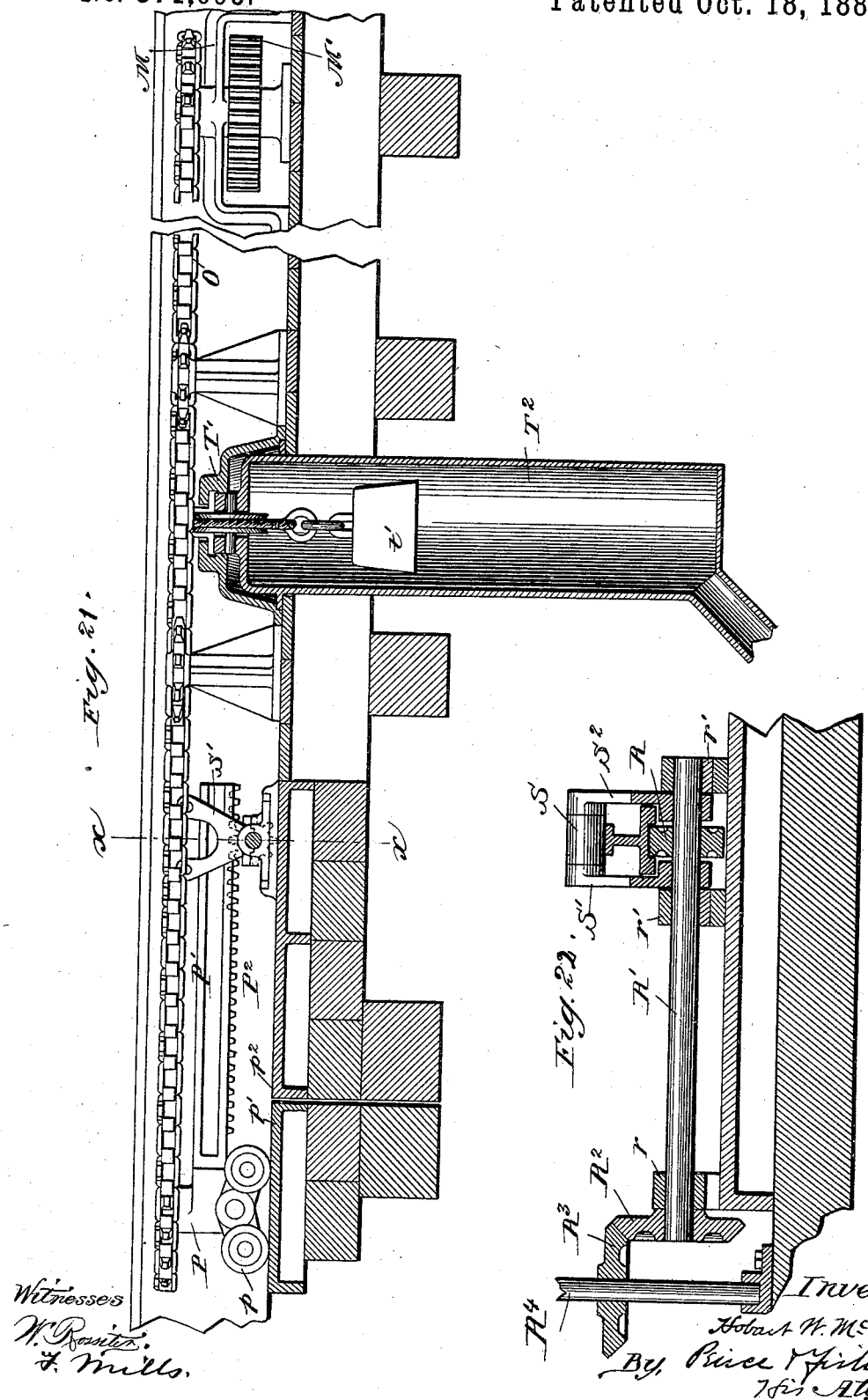

(No Model.) 7 Sheets—Sheet 7.

H. W. McNEILL.
CABLE RAILWAY APPARATUS.

No. 371,695. Patented Oct. 18, 1887.

Witnesses,
W. Rossiter
Fred H. Mills

Inventor:
Hobart W. McNeill
By Price & Fisher
His Atty's

UNITED STATES PATENT OFFICE.

HOBART W. McNEILL, OF OSKALOOSA, IOWA.

CABLE-RAILWAY APPARATUS.

SPECIFICATION forming part of Letters Patent No. 371,695, dated October 18, 1887.

Application filed March 1, 1887. Serial No. 229,355. (No model.)

*To all whom it may concern:*

Be it known that I, HOBART W. MCNEILL, residing at Oskaloosa, in the State of Iowa, have invented certain new and useful Improvements in Cable-Railway Apparatus, of which I do declare the following to be a full, clear, and exact description, reference being had to the accompanying drawings, forming part of this specification.

My present invention, while applicable, so far as certain of its features are concerned, to any of the well-known systems of cable railways, has more particular relation to cable-railway apparatus of that system wherein the propulsion of the car is effected through the medium of a sprocket-wheel upon the car adapted to engage with suitable stops placed at intervals throughout the cable.

Letters Patent granted to me on the 15th day of February, 1887, and the 1st of March, 1887, and an application, Serial No. 213,075, filed by me September 9, 1886, are referred to as more particularly illustrating the character of the apparatus to which my present invention is most applicable.

The objects of my invention are, first, to improve the construction of the tube or tunnel wherein travel the propelling cable and its sustaining-trucks; second, to improve the construction of the sustaining-truck and its lubricating apparatus and their means of connection with the cable; third, to provide the cable with an improved form of stop or button for engagement with the sprocket-wheel depending from the car; fourth, to furnish an improved construction and arrangement of pulleys for use at the curves or other points of the roadway where the direction of travel of the cable is to be changed; fifth, to provide an improved form of driving-drum of variable diameter, whereby any slight increase in the length of the cable or any wear in the periphery of the drum can be compensated for; and, sixth, to provide improved means for carrying cable cars across swinging bridges. These various objects of invention I have accomplished by the construction of apparatus hereinafter described, illustrated in the accompanying drawings, and particularly defined in the claims at the end of this specification.

Figure 24:
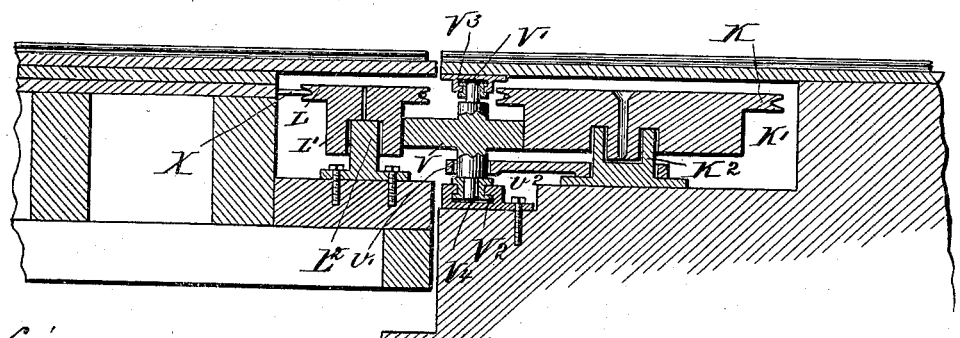

Figure 1 is a view in vertical cross-section, parts being shown in side elevation, through the cable-tube, the cable, its sustaining-truck, and lubricating device. Fig. 1$^a$ is a detail view of a portion of one of the truck-wheels. Fig. 2 is an enlarged detail view, partly in side elevation and partly in vertical longitudinal section, through the cable-sustaining truck, its lubricating device, and the guard or stop for holding said truck in position upon the cable. Fig. 3 is a rear end view of the cable-truck and its lubricating device, the wheels of the truck being omitted. Fig. 4 is a plan view of the parts shown in Fig. 3. Fig. 5 is a detail fractional view through the truck-axle and its lubricating device on line $x\ x$ of Fig. 3. Fig. 6 is a detail plan view, on reduced scale, of the abutting ends of sections of the cable tube and their expanding joints. Fig. 7 is a rear view of one section of the stops or buttons attached to the cable for engagement with the sprocket-wheel of the car, and Figs. 8 and 9 are respectively views in central vertical section and in side elevation of this section of the stops or buttons. Fig. 10 is a rear view of the other section of the cable stops or buttons, and Figs. 11 and 12 are respectively views in central vertical section and in side elevation of this section of the stops or buttons. Fig. 13 is a perspective view from the rear of the section of the cable stops or buttons illustrated in Fig. 7, and Fig. 14 is a similar perspective view of the section shown in Fig. 10. Fig. 15 is a view in vertical section through the parts of the stops when placed together upon the cable, showing also the soft-metal filling within said stops for attaching the same more securely to the cable. Fig. 16 is a plan view of a portion of the curve of the roadway, parts being broken away to show the curve-pulleys and the traveling cable. Fig. 17 is a view in transverse section on line $x\ x$ of Fig. 16. Fig. 18 is a view, on line $x\ x$ of Fig. 19, of the rim of the driving-pulley at the engine-house; and Fig. 19 is a view in longitudinal section of a portion of the rim of such driving-pulley. Fig. 20 is a plan view of the apparatus for transferring the cars from the abutments of a swinging bridge onto the swinging bridge and in position to engage with the supplemental cable on the bridge; and Fig. 21 is a view in side elevation, parts being shown in vertical section, of this transferring apparatus. Fig. 22 is a detail view on line $x\,x$ of Fig. 23. Fig. 23 is a plan view of the mechanism for throwing the supplemental cable on the bridge into gear with the terminal drum of the main cable on the abutment of the bridge; and Fig. 24 is a view, partly in central vertical section and partly in side elevation, of this mechanism.

Referring to Fig. 1 of the drawings, it will be seen that the main-cable tube consists of the side plates, A and A', and the bottom plate, $A^2$, the side and bottom plates being connected together by the rivets on one side, by the bolts $a$ on the opposite side, and the abutting sections of the tubes being united by means of the expansion-joint B, which will allow for the variation in the length of the tube-sections incident to the action of the changes in temperature. My purpose in thus connecting the side plates on one side of the cable by bolts is to enable such side to be readily removed in case it should become necessary to open the cable-tube for the purpose of repairs. The joint B consists of the angular side plates, $b$, the inner ends of which are riveted, as at $b'$, to the sides of the tube, and the outer of which are bolted together, as at $b^2$. The sides A and A' are provided, respectively, with the top plates, $a'$ and $a^2$, which are separated a sufficient distance to form the usual slot, $a^3$, to admit the arms of the sprocket-wheel of the car. Each of the side plates of the cable-tube is provided at its bottom with a suitable exterior flange, whereby it is bolted or riveted to the bottom plate, $A^2$, and with an interior flange, $a^4$, which forms the rails whereon travel the wheels of the trucks that sustain the propelling-cable, and the bottom plate, $A^2$, of the cable-tube is provided throughout its length with the ribs $a^5$, which bear against the flanges or rails $a^4$ of the side plates and aid in holding the parts securely together. At proper intervals throughout the length of the cable-tube suitable clips, $A^3$, will be fastened, with which will engage the ends of the stay-rods $A^4$, that will pass through the stringers beneath the track-rails, and will serve to better guard the sections of the cable-tube against lateral displacement, and for the purpose, also, of holding the sections of the cable-tube more firmly in position are provided the angular side brackets, $A^5$, which are bolted to the side plates of the tube and to the cross-ties whereon said tube is sustained. By thus forming and uniting the several sections whereof the cable-tube is composed I am enabled to economically construct the tube, the various parts of which will be securely held against danger of displacement.

At suitable intervals throughout the length of the propelling-cable C are placed the trucks which sustain said cable, and are also placed the stops or buttons which serve to engage with the arms of the sprocket-wheel of the car. In my present construction each sustaining-truck comprises an axle, D, to the outer reduced or shouldered ends of which are fastened the wheels D', the periphery of these wheels being provided with a suitable rim, $d$, of sound-deadening material. As shown in the modified construction illustrated in Fig. 1$^a$ of the drawings, this rim $d$, preferably of rawhide, rubber, or leather, encircles the rim of the wheel, and is held in place by means of the bolts $d'$, which pass through the flange of the truck-wheel and through the guard-plate or disk $d^2$ on the outer face of said wheel. The axle D of the sustaining-truck passes through a suitable journal-bearing extending transversely through the upper portion of the lubricating device E, and is held against lateral movement with respect thereto by means of the ring of lead or Babbitt metal, E', which fills the central annular groove, $d^3$, of the axle, and also the groove formed in the upper part, $e$, of the casting which forms the oil-reservoir $E^2$. This soft-metal ring E' is introduced, after the axle has been placed within its bearings, through the channel that communicates with the semi-cylindrical seat $e'$, formed in the upper part of the casting E, to receive the cable C.

It will be noticed that in the top of the oil-chamber E are formed the perforations $e^2$, which communicate with the bearings of the truck-axle D, and also extend through the top of the oil-chamber, so as to permit the insertion of the wicks $E^3$, which dip into the oil-chamber and bear against the truck-axle D in such manner as to constantly supply the lubricant thereto. A delivery-opening, $e^3$, is also formed in the top of the oil-chamber, $E^2$, for the admission of oil, and a suitable cover, $e^4$, is provided for this opening, as seen in Figs. 2 and 3 of the drawings.

The sustaining trucks and the lubricating device are connected with the cable in the following manner: In the upper part of the casting E is secured, preferably by dovetail joint, as seen in Fig. 5, the wrought-metal pins $E^4$, the upper ends of which pass through suitable openings formed for the purpose in the top plate, $E^5$, of the casting E, which is provided with a semi-cylindrical seat to receive the cable C, and is held in position upon the casting E by means of suitable guard-pins, $e^5$, which pass through the upper ends of the pins $E^4$.

The seats in the upper part of the casting E and in the under side of the top plate, $E^5$, are of such size as to loosely encircle the cable, so that any tendency of the cable to twist will not be communicated to the cable-trucks; but in order to prevent the cable-trucks from slipping lengthwise upon the cable each truck is set next to one of the stops or buttons of the cable, such stop being provided with a rear flat face, against which the front edge of the casting E and its cover $E^5$ will bear, and at the rear edge of this casting and its cover is placed a suitable guard-ring, $E^6$, preferably of Babbitt metal, molded around the cable in such manner that its central opening shall correspond in shape to the space between the cable-strands. From this construction it will be seen that the sustaining-trucks and their lubricating mechanism will be connected with the cable in such manner that they will not be affected by the twisting thereof, and at the same time will be securely held in proper relative position throughout the length of the cable.

The construction of stops or buttons, which are placed at short intervals throughout the length of the cable, and which serve to engage with the arms of the sprocket-wheel of the car, is illustrated more particularly in Figs. 7 to 15 of the drawings, and this construction is in the main closely similar to the construction of stops or buttons illustrated in my Letters Patent dated February 15, 1887. Each of these stops consists of what for convenience I designate the "male" and "female" sections F and F', each of these sections being provided with a slot, $f$, extending from its periphery to a point beyond its center, and of a size adapted to permit such section to be placed over the propelling-cable C. The section F is provided upon its outer or rear face with the extended portion $f'$, and upon its inner or front face with the rib $f^2$, and between these extended portions and the rib is formed the annular groove or chamber $f^3$, adapted to receive a soft-metal filling, $F^2$, in a manner to be presently described.

The female section F' of each stop is provided upon its rear face with an extension or rib, $f^4$, the outer surface of which conforms to the shape of the extension $f'$ of the section F of the stop, so that when the two sections F and F' of each stop or button are slipped over the cable from opposite sides the projections $f^4$ will enter the slot $f$ of the male section, while the rib $f^2$ of the section F will in like manner enter the slot $f$ of the section F'. The two sections of the stop will then be firmly united by suitable bolts or rivets passing through the perforations $f^5$ of the stop, the sections of the stop having been firmly clamped upon the cable. After the sections F and F' have been thus placed together upon the cable the Babbitt metal or lead will be poured into the annular chamber $f^3$ through a suitable hole formed for such purpose and extending from said chamber to the periphery of the stop. This soft-metal ring $F^2$ will enter the spaces between the strands of the cable and guard against all possibility of the stops being moved lengthwise upon the cable when the force of the load is thrown thereon.

Referring to Figs. 16 and 17, the improved construction and arrangement of pulleys for the curves of the roadway will be seen. The bottom plate of the cable-tube is provided with an extension, G, whereon is sustained the curve-pulley $G^2$, of improved construction. The journal-block G' is provided upon its upper face with the annular rib $g^2$ and with the central pin or stud, $g^3$, and the hub $G^3$ of the pulley has its lower end cut away in such manner as to form an annular flange, $g^4$, that enters the seat between the rib $g^2$ and the pin $g^3$ of the journal-plate G'. By this relative construction of the journal-plate G' and the hub $G^3$ the grooved pulley $G^2$ will be securely held in place without danger of displacement. The extension G of the bottom plate of the cable-tube is preferably provided with the upwardly-extended portion $G^5$, that is suitably bolted to the stringer of the track-rail, and upon the upper edge of this portion $G^5$ and the upper edge of the side plate, A', of the cable-tube is sustained the cover-plate $G^6$, which extends over, and, together with the parts described, forms the chamber wherein the curve-pulley revolves. It will be observed that this cover-plate $G^6$ extends over the cable-tube a slight distance, and is provided on its under face with a rib, $g^6$, that bears against the side plate, A', of the cable-tube and holds the cover-plate against lateral displacement.

In the hub $G^3$ of each curve-pulley is formed a central perforation, $g^7$, that extends through said hub and serves to deliver lubricating-oil to the journal of the pulley, and in the cover-plate $G^6$, above this oil-duct $g^7$, is formed a threaded opening that is fitted with a correspondingly-threaded plug, $g^8$, by the removal of which the lubricant can be readily poured into the oil-duct $g^7$ of the pulley-hub. By thus providing the pulley-hub with an oil-duct leading to the journal bearing of the pulley I am enabled to readily lubricate such journal-bearing without the necessity of removing the cover-plate or disturbing in anywise the action of the pulley.

Each of the curve-pulleys $G^2$ is provided around its periphery with a suitable groove adapted to receive the cable and a series of seats or deeper grooves adapted to admit the stops of the cable, and the periphery of each pulley is also provided with an extended seat or groove adapted to receive the wheel of one of the sustaining-trucks of the cable. It will be seen that by thus providing the curve-pulley with a series of independent seats for the stops or buttons of the cable and with a seat for the cable-truck each pulley will be driven at all times in such manner as to properly present its periphery to the stops and trucks of the cable, and by this arrangement all necessity of gearing the curve-pulleys together is avoided. The side plate, A', of the cable-tube at the curves of the roadway will be provided with suitable cut-away spaces to permit the curve-pulleys to pass into the tube in proper position to sustain the cable, and it will be observed that the several pulleys are so relatively arranged that as a truck passes over one pulley it will be received into its proper seat within the adjacent pulley.

In order to compensate for any slight increase in the length of the cable between its stops and trucks incident to its stretching or to the action of changes in temperature I have devised the construction of drum illustrated in Figs. 18 and 19 of the drawings. This construction of drum, while particularly applicable to the driving-drum in which it is most desirable that the cable-stops should accurately engage with their seats in the rim of the drum, is also applicable to the terminal drums for changing the direction of travel of the cable. In these figures, H designates the rim of the drum, the body of which may be of suitable or well-known construction, and within this rim are formed the seats or depressions $h$, of a size to receive the stops or buttons of the cable, and it is obvious that larger seats or depressions in the rim of the wheel may be provided to admit the cable-sustaining trucks when the wheel or drum is used in systems employing cable-trucks.

Between the several seats or grooves $h$ and $h'$ are fitted movable blocks H', the outer edges of which, like the rim of the wheel, are provided with grooves to receive the cable, and at the back of each of these blocks H' is bolted, as at $h^2$, the plate $h^3$, through which passes the threaded bolt H$^2$, that works in a correspondingly-threaded seat in the rim H of the driving-wheel, and is furnished at its outer end with the squared portions $h^4$, by means of which it can be turned.

It will be observed that the blocks H' are securely held within the rim H by means of the flanges $h^5$ thereof, so that whatever position these blocks may occupy they will be firmly held against danger of accidental displacement. From this construction it is apparent that when an increase in the diameter of the driving-wheel is to be effected it is only necessary to turn the adjusting-bolts H$^2$ in such direction as to force the blocks H' outwardly, after which they will be held by means of the set-nuts $h^6$.

It will be understood that any convenient means for varying the diameter of the rim of the driving-wheel may be employed without departing from the spirit of my invention, which is designed to cover, broadly, the combination, with the cable having stops at intervals throughout its length, of a driving wheel or drum the diameter of which can be varied, and which is provided with suitable seats to receive the stops of the cable.

The mechanism for transmitting motion to a supplemental cable upon a swinging bridge from the main cable and the mechanism for transferring the cars from the main to the supplemental cable, are particularly designed as an improvement upon the mechanism shown for like purpose in an application filed by me in the Patent Office on the 9th day of September, 1886, and illustrated in Figs. 20 to 24 of the annexed drawings.

K designates the terminal drum of the main cable, this drum being placed upon an abutment at the end of the roadway adjacent the swinging bridge; and L denotes one of the four drums or pulleys which will be placed upon the swinging bridge, one of such pulleys being located near the center of each track at each end of the bridge.

I shall first describe the mechanism whereby the car is to be transferred from the main cable to a position where its sprocket-wheel can engage with the supplemental cable upon the bridge, this mechanism being particularly illustrated in Figs. 20, 21, and 22 of the drawings.

At a point upon the abutment near the terminal drum K of the main cable is journaled within a suitable bracket, M, the shaft of the cog-wheel M', that is in gear with and is constantly driven by a corresponding cog-wheel upon the shaft or axle of the terminal drum K, this method of gearing being well known and not requiring specific illustration. Upon the upper end of the shaft which carries the cog-wheel M' is fixed the sprocket-wheel N, the teeth $n$ of which enter corresponding openings in the links of the flat chain O, which pass around this sprocket-wheel and also around a corresponding sprocket-wheel, N'. The sprocket-wheel N' is fixed to the upper end of a shaft, N$^2$, that is journaled within a suitable vertical bearing, P, at the outer end of the wheel-carriage P', such outer end of the wheel of this carriage being mounted upon friction-rollers $p$, that move upon suitable ways or rails, $p'$ and $p^2$, placed, respectively, upon the bridge and the abutment, and adapted to be brought coincident when the swinging bridge is closed.

The carriage P' in the construction shown consists of a rail provided upon its under face with the rack-bar P$^2$, that engages with a suitable pinion, R, that is keyed to the countershaft R', and the rear end of this carriage is encircled by the guide-bracket S, the arms S' and S$^2$ of which are held upon the shaft R' in such manner as to be capable of a slight movement about such shaft. My purpose in thus mounting and sustaining the carriage P' is to permit of a slight vertical play to said carriage in order to compensate for any oscillating movement of the bridge or for any irregularity between its upper surface and the surface of the abutment. The shaft R', which is journaled, as shown, within suitable brackets, $r$ and $r'$, is provided at its outer end with a beveled gear-wheel, R$^2$, which engages with a corresponding gear-wheel, R$^3$, that is keyed to the vertical shaft R$^4$ near its lower end, and the upper end of this shaft R$^4$ is preferably provided with a suitable squared portion to receive a hand-crank, by means of which the shaft can be turned.

From the construction as thus far defined it will be seen that when the parts are in the relative position shown in Fig. 20 of the drawings (at which time the swinging bridge will be closed) the sprocket-chain O will receive motion from the terminal drum K, and will be moved in the direction of the arrow; hence, if a car be brought by the main cable as far as the terminal drum K, the projecting arms of the sprocket-wheel of the car will be caught by the teeth $o$, that extend laterally from certain of the links of the sprocket-chain O, these teeth being at distances apart corresponding to the distance between the stops of the main cable. The car will therefore be carried by the sprocket-chain O from the main cable and be delivered into such position upon the bridge that the arms of its sprocket-wheel will be caught by the stops or buttons upon the supplemental cable X upon the bridge. When it is desired to swing the bridge, the sprocket-wheel $N^2$ and its sustaining-carriage P' will be moved backward by the turning of the vertical shaft $R^4$ and the counter-shaft R', that is in gear therewith, and the cog-wheel R of which engages with the rack-bar $P^2$ of the movable carriage. In order to take up the slack of the sprocket-wheel O incident to this backward movement of the sprocket-wheel $N^2$, I have provided the movable sprocket-wheel $N^3$, that is placed between the lengths of the sprocket-chain O, and is mounted upon the sliding block T, that is held within the grooved plate or bracket T' upon the abutment. To the rear end of this sliding block T is connected the rope $t$, which carries at its opposite end the weight $t'$, that is sufficiently heavy to move backward the sliding block or plate T and the spocket-wheel $N^3$, and thus take up the slack of the sprocket-chain O. The rope $t$, which sustains the weight $t'$, passes over a suitable pulley, $t^2$, that is journaled in the top of the pit $T^2$, which is of sufficient size and depth to permit the free movement of the weight.

In order to better control the movement of the sprocket-chain when this slack is being taken up by the sprocket-wheel $N^3$, I have provided the sprocket-wheels $N^4$ and $N^5$, one at each side of the bracket T', which sustains the sliding block T, and it will be seen that as the sprocket-wheel $N^3$ moves backward the sprocket-chain O will pass around and between the fixed sprocket-wheels $N^4$ and $N^5$.

In order to communicate motion from the terminal drum of the main cable to one of the drums or pulleys L of the supplemental or bridge cable X, I have provided the mechanism illustrated in Figs. 23 24, and of the drawings. In this mechanism the main terminal drum K is located upon the bridge abutment with its periphery extending near the edge thereof, and is preferably of such diameter that it will properly direct the lengths of the main cable into the cable-tubes of the adjoining tracks. This terminal drum K has connected therewith a suitable friction-drum, K', somewhat smaller in diameter than the main terminal drum. The supplemental cable upon the bridge passes around a series of pulleys, L, one of these pulleys having a friction-drum, L', connected therewith, the pulley and friction-drum in the construction shown being journaled upon a suitable shaft, $L^2$, attached to the bridge-frame.

Between the friction-drums K' and L', and preferably sustained upon the bridge-abutment, is placed the movable friction gear-wheel V, the purpose of which is to communicate motion from the main terminal wheel K to the supplemental cable upon the swinging bridge. This friction gear-wheel V is mounted in such manner that it can be readily thrown into and out of gear with the friction-drums K' and L', according as the bridge-cable is to be driven or not.

In the drawings the friction gear-wheel V is shown as journaled within suitable sliding journal-bearings V' and $V^2$, which move within the grooved plates $V^3$ and $V^4$, and around the shaft $v$ of this friction gear-wheel is preferably loosely fitted the swinging arm $v^2$, the opposite end of which may encircle the journal-plate $K^2$ of the main terminal drum. To the swinging arm $v^2$ is attached a rope or chain, W, that passes over a suitable pulley, $w$, beneath the road-bed, and sustains a weight, W', that moves within a suitable pit adapted to receive the same. To the opposite side of the swinging arm $v^2$ is connected a chain or rope, $W^2$, that passes around a suitable winding-post, $W^3$, at one side of the roadway. From the foregoing construction it will be seen that when it is desired to throw the supplemental bridge-cable into gear with the main cable it is only necessary to release the winding-post $W^3$ in such manner as to permit the weight W' to draw the friction gear-wheel V into such position that its periphery will bear upon both the friction-drums K' and L', and thus serve to communicate motion from the main cable to the supplemental cable upon the bridge.

It will be observed that the periphery of the friction-drum L' is of considerable breadth, my purpose in so forming this drum being to allow for the slight oscillating movement which is found to occur in all swinging bridges, and it will be seen that even should the end of the bridge have a movement in vertical direction of several inches the friction gear-wheel V would still engage with the periphery of the friction-drum L'. When the swinging bridge is to be opened and it is consequently desired to throw the supplemental cable out of gear with the main cable, it is only necessary to turn the winding-post $W^3$ in such manner as to move the friction gear-wheel backward until the swinging bridge is free to pass the same.

In the drawings I have shown one simple form of friction-gear for connecting the main cable with the supplemental cable. It will be readily understood that this particular form may be varied without departing from the spirit of my invention, and that the friction-drums K' and L' need not be mounted upon the same shafts with the cable pulleys.

It will be readily understood that many of the details of construction above set out may be varied either when the apparatus is to be used with the particular cable-railway system above described or when certain of its features are to be employed in connection with that system of cable apparatus wherein a gripper is used for connecting the car with the constantly-traveling cable. Thus, for example, I regard it as within the scope of my invention to use a cable instead of the chain O between the main cable and the supplemental cable upon the bridge. So, also, other details may be varied without departing from the spirit of my invention.

Having thus described my invention, what I claim as new, and desire to secure by Letters Patent, is—

1. In cable-railway apparatus, a tube or tunnel comprising the side plates, A and A', having formed integral therewith the exterior bottom flanges and the rails, and the bottom plate, $A^2$, having the longitudinal ribs $a^5$ thereon, substantially as described.

2. In cable-railway apparatus, the combination, with the sustaining-truck wheel, of the sound-deadening ring, and the plate for sustaining said ring in position upon the rim of the wheel, substantially as described.

3. In cable-railway apparatus, the combination, with the axle of the sustaining-truck, of an oil-chamber provided in its upper part with a journal-bearing and with a seat for the cable above said journal-bearing, and provided also upon its upper side with a filling-orifice, and with one or more wick-openings extending through the top of the chamber and communicating with the journal-bearing, substantially as described.

4. In cable-railway apparatus, the combination of the axle D of the sustaining-truck having a reduced portion formed therein, and a suitable casting, E, forming an oil-chamber, $E^2$, said casting being provided in its upper portion with a suitable bearing for the truck-axle, and with a suitable groove to receive a soft-metal guard-ring for sustaining said axle in position, substantially as described.

5. In cable-railway apparatus, the combination, with the truck-axle, of the casting forming a lubricating-chamber, said casting having in its upper part a seat for the cable, and having a suitable top plate, $E^5$, affixed thereto, substantially as described.

6. In cable-railway apparatus, the combination, with the sustaining-truck axles and the lubricating-chambers affixed to the cable in a manner free to turn thereon, of stops or guards affixed to the cable to guard the axles and lubricating-chambers against longitudinal displacement, substantially as described.

7. In cable-railway apparatus, the combination, with the cable, of grooved or chambered stops or buttons bolted together, and soft or cast metal rings or guards within said stops or buttons, having their inner faces corresponding with irregularities in the cable, substantially as described.

8. In cable-railway apparatus, the combination, with the cable, of a stop or button formed of the section F and F', having, respectively, the extended portions $f'$ and $f^4$, suitably grooved to receive a guard-ring, and having the grooves $f$, and a soft-metal ring, $F^2$, within said buttons and surrounding the cable without joint or break, substantially as described.

9. In cable-railway apparatus, the combination, with suitable journal-bearings at the curve of the roadway, of a series of curve-pulleys located in close proximity to each other, and each provided in its periphery with a single seat for a cable-truck, and with a series of small seats for the cable-stops, said small seats corresponding in number to the stops between the cable trucks, substantially as described.

10. In cable-railway apparatus, the combination of a pulley for changing the direction of travel of the cable, having an extended hub, and a journal-block for said pulley, having an annular rib, and a central pin to engage with the hub, substantially as described.

11. In cable-railway apparatus, the combination of a journal-block having an annular rib, and a pulley for changing the direction of travel of the cable, having an extended hub fitting within said annular rib, and provided with a perforation whereby oil may be admitted to its bearing, substantially as described.

12. In cable-railway apparatus, the combination, with the main cable having stops at intervals thereon, of a drum of variable diameter, and provided with a series of grooves to admit the stops of the cable, substantially as described.

13. In cable-railway apparatus, the combination, with the main cable suitably mounted upon the bridge-abutment and the supplemental cable mounted upon the swinging bridge, of a transferring chain or cable, a fixed wheel for said transferring chain or cable, a movable wheel for said chain or cable, and mechanism for taking up the slack of said chain or cable, substantially as described.

14. In cable-railway apparatus, the combination, with the main cable suitably mounted upon the bridge-abutment and the supplemental bridge-cable suitably mounted upon the bridge, of a transferring chain or cable, a fixed pulley for said chain or cable, a movable pulley for said chain or cable, a sliding carriage whereon said movable pulley is mounted, and a movable pulley for taking up the slack of the transferring chain or cable, substantially as described.

15. In cable-railway apparatus, the combination, with the main cable suitably mounted upon the bridge-abutment and the supplemental bridge-cable and its drums, of the transferring chain or cable, suitable wheels or pulleys for said chain or cable, and a carriage for the outer pulley of the transferring chain or cable, said carriage being sustained in a manner permitting its vertical movement, substantially as described.

16. In cable-railway apparatus, the combination, with the main cable and its terminal drum and a supplemental bridge-cable and its terminal drums, of a transferring-chain, O, having teeth or stops $o$, the sprocket wheels or pulleys N and N', the sliding carriage P, the sprocket wheels or pulleys $N^3$, $N^4$, and $N^5$, the sliding plate T, the rope $t$, and weight $t'$, substantially as described.

17. In cable-railway apparatus, the combination, with the main cable and suitable supports therefor and the supplemental bridge-cable and suitable drums therefor, of a friction-drum in suitable connection with the terminal drum of the main cable, a friction-drum in suitable connection with a drum of the supplemental cable, and a movable friction-wheel for transmitting motion from the main cable to the supplemental cable, substantially as described.

18. In cable-railway apparatus, the combination, with the main cable and its terminal drum and the supplemental bridge-cable and suitable terminal drums, of a friction-drum in suitable connection with the terminal drum of the main cable, a friction-drum in suitable connection with the drum of the supplemental cable, a movable friction-wheel for connecting said friction-drums, and a winding-chain for shifting said gear-wheel, substantially as described.

HOBART W. McNEILL.

Witnesses:
GEO. P. FISHER, Jr.,
R. E. GRAVES.